United States Patent
Stevens et al.

[11] Patent Number: 6,073,937
[45] Date of Patent: Jun. 13, 2000

[54] COMPOSITE TOP PLATE FOR A FLUID FILTER AND AN ASSOCIATED METHOD FOR FORMING A COMPOSITE TOP PLATE ADAPTED FOR ATTACHMENT TO A FLUID FILTER

[75] Inventors: Samuel B. Stevens, Pekin; Jack N. Seibel, Peoria, both of Ill.

[73] Assignee: Caterpillar Inc., Peoria, Ill.

[21] Appl. No.: 08/984,355

[22] Filed: Dec. 3, 1997

[51] Int. Cl.[7] ........................................................ F16J 15/02
[52] U.S. Cl. .......................... 277/653; 277/918; 210/232; 210/444; 210/DIG. 17; 264/274
[58] Field of Search .................................. 210/444, 232, 210/DIG. 17; 264/274, 279.1; 277/653, 918

[56] References Cited

U.S. PATENT DOCUMENTS

| | | |
|---|---|---|
| 2,976,093 | 3/1961 | Reiling . |
| 3,038,211 | 6/1962 | Luedi . |
| 3,191,950 | 6/1965 | Hiltner . |
| 4,342,799 | 8/1982 | Schwochert . |
| 4,535,827 | 8/1985 | Seaford . |
| 4,992,166 | 2/1991 | Lowsky et al. ................... 210/DIG. 17 |
| 5,020,207 | 6/1991 | Minoda et al. ...................... 264/274 X |
| 5,121,932 | 6/1992 | Goldman et al. . |
| 5,147,591 | 9/1992 | Yoshida . |
| 5,906,736 | 5/1999 | Bounnakhom et al. ................ 210/232 |
| 5,906,740 | 5/1999 | Brown et al. ..................... 210/DIG. 17 |
| 5,914,035 | 6/1999 | Bradford ................................ 210/232 |
| 6,019,229 | 2/2000 | Rao ..................................... 277/918 X |

Primary Examiner—Terry Lee Melius
Assistant Examiner—Greg Binda
Attorney, Agent, or Firm—C. E. Glastetter; Maginot, Addison & Moore

[57] ABSTRACT

A composite top plate and methods for manufacturing same are described. The top plate includes a metal insert and a non-metallic member. The metal includes a central portion and a flange portion having cut outs to provide an intermittent surface. The non-metallic member is formed on the metal insert and a portion of the non-metallic material is received in the cutouts to thereafter hold the metal fixed relative to the non-metallic member.

5 Claims, 2 Drawing Sheets

COMPOSITE TOP PLATE FOR A FLUID FILTER AND AN ASSOCIATED METHOD FOR FORMING A COMPOSITE TOP PLATE ADAPTED FOR ATTACHMENT TO A FLUID FILTER

TECHNICAL FIELD

This invention relates generally to a fluid filter and more particularly to a composite top plate for the fluid filter having a non-metallic member molded in place on a threaded metal insert.

BACKGROUND ART

A conventional spin-on, disposal-type fluid filter includes the filter element positioned within the filter canister and the metal top is connected to the housing by a known welding process or clinching process to create a leak proof seam therebetween. The top plate is threadably fastened to the mounting, such as an engine block, when in use. One problem is that the top plate must be assembled by a clinching or welding process which adds cost.

The present invention is directed to overcoming one or more of the problems as set forth above.

DISCLOSURE OF THE INVENTION

In one aspect of the present invention, a composite top plate adapted for use on a filter comprises, a metal insert having a central portion and a flanged portion. The flanged portion has an intermittent surface. A non-metallic member sealingly engages the filter. The non-metallic member is formed on the metal insert and interacts with the intermittent surface of the flanged portion to retain the metal insert fixed relative to the non-metallic member.

In another aspect of the present invention, a method for forming a composite top plate to be attached to a filter comprises the steps of forming a metal insert having a central portion and a flange portion having an intermittent surface and forming a non-metallic member on the metal insert for holding the metal insert fixed relative to the non-metallic member.

BEST MODE FOR CARRYING OUT THE INVENTION

Figure 1:
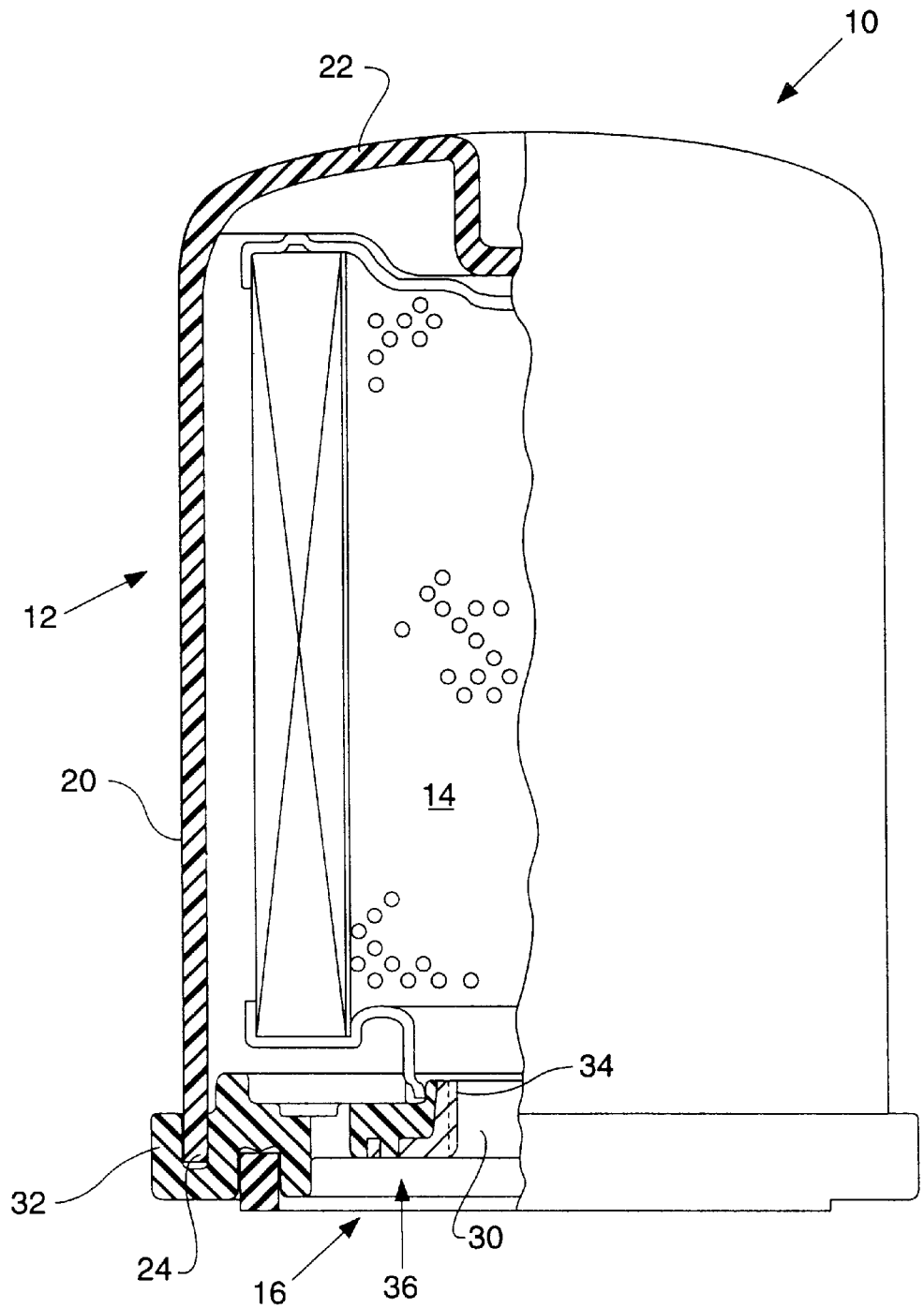
FIG. 1 is a filter arrangement showing the present invention.

Referring to the drawings, a fluid filter 10 includes a housing 12, a filter element 14 and a composite top plate 16.

The housing 12 includes a cylindrical side wall 20, a closed end 22 and a open end 24 for receiving the composite top plate 16.

The composite top plate 16 includes a circular metal insert 30 and a non-metallic member 32 formed on the metal insert 30 as an assembly. The metal insert includes a central portion 34 and a flange portion 36. The central portion 34 has a central aperture 38 having threads 40 for attachment to a mounting structure such as an engine, not shown. The flange portion 36 perpendicularly extends from the central portion 34 and has a outer peripheral surface 42. A plurality of cutouts, such as notches 44, slots or convolutions, are formed in the peripheral surface 42 of the flange portion 36 to provide the peripheral outer surface 42 that is intermittent. The cutouts 44 extend from the peripheral surface 42 toward the central portion 34.

Figure 2:
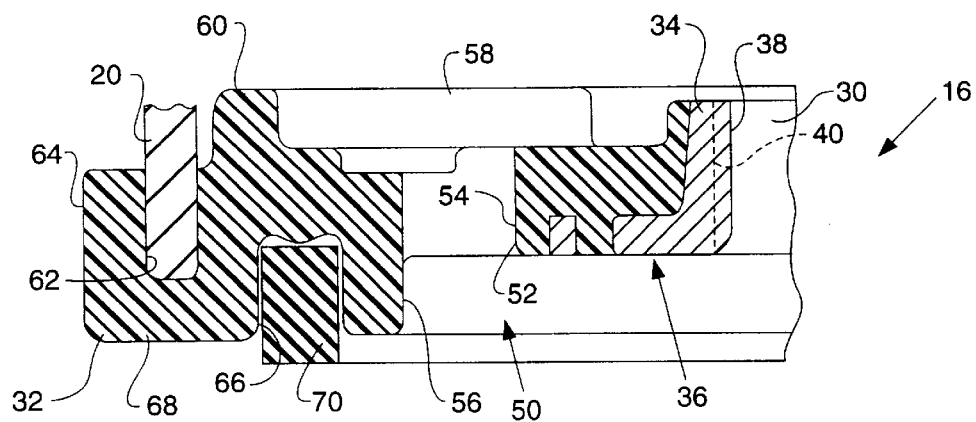
FIG. 2 is an enlarged sectional view of a top plate of the present invention.
Figure 3:
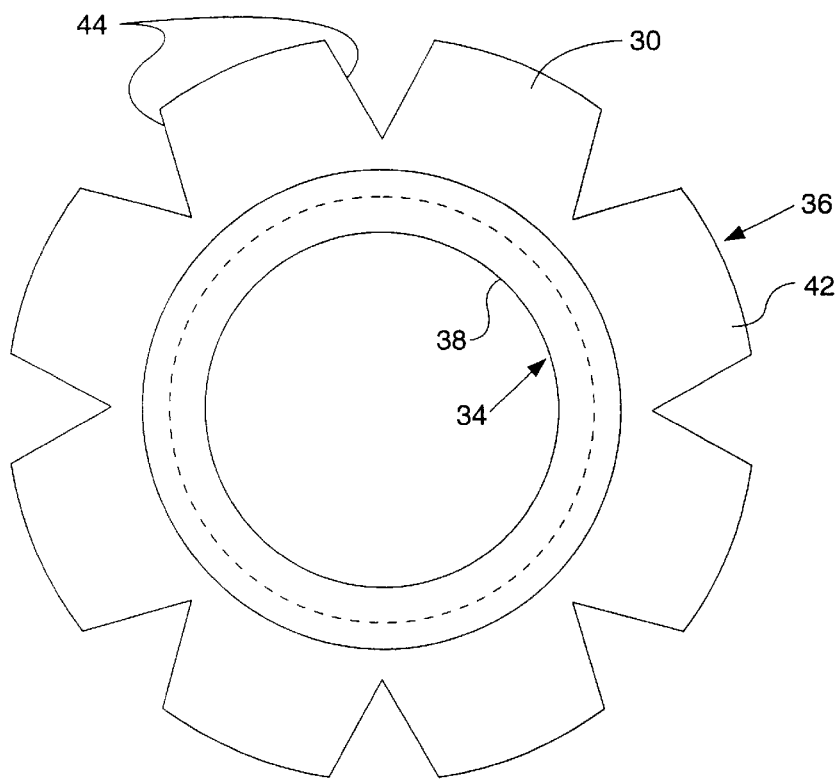
FIG. 3 is an enlarged view of a metal insert used in the top plate.

The non-metallic member 32 is formed on the metal insert by molding or casting. When the nonmetallic member is formed on the metal insert the notches in the flange portion 36 receive portions of the non-metallic material to thereafter hold the insert fixed relative to the non-metallic member. The non-metallic member of the top plate 16 includes a plurality of fluid inlet openings 50. Each inlet opening 50 includes a substantially circular portion 52 which extends through the non-metallic member 32 and is bordered inwardly by an upstanding semicircular wall 54 and outwardly by a sloped semicircular wall 56. Each inlet opening 50 is separated from adjacent openings 50 by a radial rib 58 which terminates in a first annular raised ring 60. The raised ring 60 is bordered outwardly by a groove 62 which is bordered outwardly by a second raised annular ring 64. In use, the filter side wall 20 is positioned in the annular groove 62. The bottom, as viewed in FIG. 2, of the non-metallic member includes a channel 66 formed in a substantially planer surface 68, which receives a sealing gasket 70. The sealing gasket 70 provides a seal between the top plate 16 and the filter mounting when the filter is attached to the mounting.

INDUSTRIAL APPLICABILITY

In the use of the fluid filter 10 the composite top plate 16 is attached to the side wall 20 for closing the open end 24 of the housing 12. The composite top plate 16 includes the metal insert 30 which is formed by cutting the notches 44 in the flange portion 36. The non-metallic member 32 is formed, by molding or casting, on the metal insert to form the composite top plate. As the non-metallic member is formed on the metal insert a portion of the material is received in the notches to thereafter positively hold the metal insert fixed in the composite top plate.

In view of the forgoing, it is readily apparent that the non-metallic material will be received in the notches to positively hold the metal inset fixed relative to the non-metallic member.

Other aspects, objects and advantages of this invention can be obtained from a study of the drawings, the disclosure and the appended claims.

What is claimed is:

1. A composite top plate adapted for use on a filter, comprising:

a metal insert having a central portion and a flanged portion, the flanged portion having a peripheral surface, wherein (i) the peripheral surface has a notch formed therein, (ii) the notch is defined by a first planar side wall segment and a second planar side wall segment so that the notch has an open end and a closed end, and (iii) the first planar side wall segment and the second planar side wall segment are positioned relative to one another so that the first planar side wall segment and the second planar side wall segment intersect at the closed end of the notch; and a non-metallic member for sealingly engaging the filter, the non-metallic member being formed on the metal insert and interacts with the notch defined in the peripheral surface of the flange portion to retain the metal insert fixed to the nonmetallic member.

2. The composite top plate of claim 1, wherein the central portion of the metal insert includes a central aperture having internal threads formed therein.

3. The composite top plate of claim 1, wherein the non-metallic member is cast on the metal insert.

4. The composite top plate of claim 1, wherein the non-metallic member is molded on the metal insert.

5. A method for forming a composite top plate adapted for attachment to a filter, comprising the steps of:

forming a threaded metal insert including a flange portion having a plurality of notches therein to form an intermittent outer surface, wherein (i) each of the notches is defined by a first planar side wall segment and a second planar side wall segment so that each notch has an open end and a closed end and (ii) the first planar side wall segment and the second planar side wall segment of each notch are positioned relative to one another so that the first planar side wall segment and the second planar side wall segment intersect at the closed end of the notch; and forming a non-metallic member on the metal insert and being received within the notches for holding the metal insert fixed relative to the non-metallic member.

* * * * *